United States Patent
Baumann et al.

(10) Patent No.: US 10,240,565 B2
(45) Date of Patent: Mar. 26, 2019

(54) FUEL FILTER INSERT HAVING A PRE- AND A MAIN FILTER ELEMENT, AND A FUEL FILTER

(71) Applicant: Mann+Hummel GMBH, Ludwigsburg (DE)

(72) Inventors: Christoph Baumann, Moeglingen (DE); Idriss Razgani, Ludwigsburg (DE); Jonas Eble, Erlenbach (DE); Lars Spelter, Ditzingen (DE); Christopher Mueller, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 456 days.

(21) Appl. No.: 15/066,151

(22) Filed: Mar. 10, 2016

(65) Prior Publication Data
US 2016/0265496 A1    Sep. 15, 2016

(30) Foreign Application Priority Data
Mar. 13, 2015  (DE) .................. 10 2015 003 162

(51) Int. Cl.
*B01D 17/04*    (2006.01)
*B01D 29/58*    (2006.01)
(Continued)

(52) U.S. Cl.
CPC ......... *F02M 37/221* (2013.01); *B01D 17/045* (2013.01); *B01D 17/10* (2013.01);
(Continued)

(58) Field of Classification Search
CPC ...... B01D 17/045; B01D 17/10; B01D 29/58; B01D 35/005; B01D 36/001;
(Continued)

(56) References Cited

U.S. PATENT DOCUMENTS

| 3,312,350 A * | 4/1967 | Kasten ................. B01D 35/005 210/307 |
| 3,900,400 A | 8/1975 | Whitfield |
| 5,236,579 A * | 8/1993 | Janik .................... F02M 37/221 210/94 |
| 5,766,468 A | 6/1998 | Brown et al. |
| 7,163,003 B2 | 1/2007 | Bradford |
| 2006/0006109 A1 * | 1/2006 | Klein .................. B01D 36/003 210/299 |

(Continued)

FOREIGN PATENT DOCUMENTS

| DE | 202006004527 U1 | 8/2007 |
| DE | 102008048228 A9 | 5/2010 |
| WO | 2006070221 A1 | 7/2006 |

*Primary Examiner* — Jason M Greene
(74) *Attorney, Agent, or Firm* — James Hasselbeck

(57) ABSTRACT

A fuel filter insert for a fuel filter including: a pre-filter element having a upper and lower end plate, the end plates arranged on opposing ends of filter medium of the pre-filter element; a main filter element having upper and lower end plates, the end plates arranged on opposing ends of filter medium of the main filter element; wherein the pre-filter element and the main filter element as arranged one above the other in a direction of a longitudinal axis of the fuel filter insert; wherein at least one of the filter elements is through-flowable from the outside to the inside by fuel in a radial direction relative to the longitudinal axis; and a flow channel for the fuel pre-filtered by the pre-filter element; wherein the flow channel is arranged to extend in the axial direction between the pre-filter element and the main filter element.

13 Claims, 3 Drawing Sheets

(51) Int. Cl.
  *B01D 36/00* (2006.01)
  *F02M 37/22* (2006.01)
  *B01D 35/00* (2006.01)
  *B01D 17/00* (2006.01)
(52) U.S. Cl.
  CPC ............ *B01D 29/58* (2013.01); *B01D 36/001* (2013.01); *B01D 36/003* (2013.01); *B01D 2201/295* (2013.01); *B01D 2201/347* (2013.01)
(58) Field of Classification Search
  CPC ............ B01D 36/003; B01D 2201/291; B01D 2201/295; B01D 2201/347; F02M 37/22; F02M 37/221
  See application file for complete search history.

(56) References Cited

U.S. PATENT DOCUMENTS

| | | | |
|---|---|---|---|
| 2008/0272046 A1* | 11/2008 | Lampert | B01D 29/58 210/312 |
| 2010/0314303 A1* | 12/2010 | Reyinger | B01D 36/001 210/130 |
| 2011/0017649 A1* | 1/2011 | Sasur | B01D 36/003 210/232 |
| 2011/0036770 A1* | 2/2011 | Jokschas | B01D 36/001 210/440 |
| 2011/0253608 A1* | 10/2011 | Volkmer | B01D 29/58 210/131 |
| 2013/0327699 A1* | 12/2013 | Gaenswein | B01D 29/58 210/335 |
| 2014/0263022 A1* | 9/2014 | Saito | B01D 35/005 210/266 |

\* cited by examiner

FUEL FILTER INSERT HAVING A PRE- AND A MAIN FILTER ELEMENT, AND A FUEL FILTER

TECHNICAL FIELD

The present invention relates to a fuel filter insert, having a pre- and main filter element, and to a fuel filter having such a fuel filter insert.

BACKGROUND OF THE INVENTION

DE 10 2008 048 228 A9 discloses a fuel filter having a fuel filter insert including a pre-filter element and a main filter element which are situated one after the other in the axial direction to the longitudinal axis of the fuel filter. The fuel pre-filtered by the pre-filter element is pumped to the main filter element by way of a fuel pump situated outside of the filter housing.

A fluid filter having a filter housing is known from U.S. Pat. No. 3,900,400 B, in which two filter elements are arranged one above the other in the direction of the longitudinal axis of the fluid filter and which can be exchanged independent from each other. An inlet channel is formed for the fluid between the two filter elements, which is axially limited by a lower end plate of the two filter elements and by a housing clamping plate spring elastically braced at the end plate. By means of the housing clamping plate, the upper filter element of the two filter elements sealingly abuts at the housing cover of the filter housing.

EP 0 852 158 A1 shows a fuel filter having two fluidically connected filter elements situated one after the other which, in the direction of the longitudinal axis of the fuel filter, are situated one above the other.

WO 2006/070221 A1 shows a further fuel filter having a pre- and main filter element which are situated in a concentric manner to the longitudinal axis of the fuel filter.

Similar fuel filters are known from DE 20 2006 004 527 U1 and EP 1 485 605 B1.

SUMMARY OF THE INVENTION

The object of the present invention is to indicate a fuel filter insert having a pre- and a main filter element, and a fuel filter having a fuel filter insert, which enable, through a compact and simplified structure, a further simplified handling and which, at the same time, can be cost effectively manufactured.

The pre-filter element and the main filter element of the fuel filter insert can reliably free the fuel from contaminants therein included. In this instance, the pre-filter element can be advantageously configured as a coarse filter for out-filtering coarser particulate contaminants and the main filter element can be configured as a microfilter for out-filtering smaller particulate contaminants from the fuel. In this respect, the filter media of the pre- and a main filter element may differ, in particular with regard to their pore width. Moreover, the fuel filter insert according to the present invention can be realized having an overall more compact design. Since the two end plates of the two filter elements assigned to each other, that is, the lower end plate of the main filter element and the upper end plate of the pre-filter element, directly limit the flow channel in the axial direction, an overall simplified design of the fuel filter element results. For this reason, the fuel filter insert can be manufactured in a particularly cost effective manner. Moreover, handling the fuel filter element is further simplified when installing or removing the insert in a filter housing of the fuel filter element.

In order to exchange the pre- and main filter elements in a particularly simple and safe manner, the end plates of the pre-filter element and of the main filter element assigned to each other, which limit the flow channel, can, for jointly removing the main filter element and the pre-filter element, be connected to each other, preferably be integrally configured. Furthermore, a specified geometry of the flow channel and also a reliable positioning of the end plates in the filter housing relative to a fuel outlet of the filter housing can be realized in a simplified manner. The two end plates can be implemented in particular as a plastic injection part. This offers further advantages regarding cost and manufacture.

The pre-filter element and the main filter element can each include respectively one annular filter medium situated about the longitudinal axis of the fuel filter insert. In this instance, the filter medium is preferably braced on the inside at a lattice-shaped support pipe to prevent that the filter medium collapses when the filter medium is through-flown from radially outside to radially inside. In this instance, the filter media can each be implemented as a filter bellows pleated in a star formation.

According to one embodiment of the present invention, the two end plates are connected to each other by one or a plurality of spacer elements which are situated between the two end plates and which are attached, in particular molded, to the two end plates. It is evident that the spacer element(s) in this instance is/are not to completely displace the flow channel in the radial direction.

The two end plates of the pre- and the main filter element limiting the flow channel can include respectively one (radial) sealing element to reliably seal the flow channel vis-a-vis a filter housing of a fuel filter. The sealing element is advantageously made out of a (fuel resistant) elastomer. Furthermore, the sealing element can offset manufacture tolerances of the fuel filter insert/filter housing or contaminants adhering to the inside of the filter housing.

According to the present invention, the main filter element can include a water separation unit to separate water included in the fluid. In doing so, an internal combustion engine actuated by the fuel or a fuel injection can be reliably protected from a potentially harmful water content of the fuel.

The water separation unit of the main filter element preferably includes a water separation gap fluidically connected at one end to a water discharge channel which extends in the axial direction at least in sections through the pre-filter element. The water separated from the fuel may be led out via the water discharge channel, and, in this way, can be supplied, for example, to a water collecting chamber of the filter housing of a fuel filter. In doing so, the fuel filter insert can be implemented in a particularly compact manner so that the fuel filter insert itself can be inserted even into filter housings having a narrow installation space. The water separation gap can be particularly situated between a filter medium of the main filter element and a screen pipe of the main filter element functioning as an end separator.

The water discharge channel is limited radially on the outside preferably by a wall element which is attached, in particular molded, to the end plate of the main filter element limiting the flow channel. In this case, the wall element projects from the main filter element in the axial direction and extends at least partially through the pre-filter element. Moreover, the wall element can separate a low pressure area of the fuel filter insert including the pre-filter element from a high pressure area of the fuel filter insert including the water separation unit. The fuel filter insert can be manufactured in a cost effective and simple manner by means of the wall element integrally implemented with the end plate of the main filter element.

The water separation unit can include a coalescing medium to most efficiently separate water, which is preferably situated fluidically connecting downstream of a filter medium of the main filter element. The coalescing medium can, if needed, be configured in one or a plurality of layers.

According to a preferred embodiment, the previously mentioned wall element limits, together with an end plate facing away from the main element, that is, the lower end plate of the pre-filter element, a receiving gap provided to sealingly receive a housing or water discharge nozzle of a filter housing. For this purpose, the lower end plate of the pre-filter element and also the wall element can each be provided with one elastomeric sealing element. Preferably, the elastomeric sealing elements have sealing surfaces radially opposite to each other.

Alternative to forming a receiving gap, the wall element can be sealingly connected to the lower end plate. The sealing at a housing or water discharge nozzle can, in this case, occur, for example via a sealing element situated radially inside at the wall element.

The fuel filter according to the present invention includes a filter housing and a previously described fuel filter insert situated in the filter housing. The fuel filter insert sealingly abuts with the two end plates, which are limiting the flow channel, at the inside of the filter housing. The sealing abutment of the fuel filter insert at the filter housing can occur in the axial or in the radial direction. A lateral fuel outlet is formed at the filter housing, via which the flow channel is fluidically connectable to the fuel pump to pump the fuel pre-filtered by the pre-filter element via a fuel outlet of the filter housing, preferably formed laterally at the filter housing, to the main filter element. The fuel filter having a compact installation size can be realized at a high filtering performance by a structurally simple filter housing. This offers cost advantages.

It is evident that the filter housing has to be configured in an openable manner for exchanging the fuel filter insert. To this end, the filter housing preferably includes a filter pot having a (single) insertion opening for the fuel filter insert, which is closeable by means of a housing cover. The housing cover can be attachable to the filter pot by screws or by other means.

According to the present invention, the filter housing can have a ventilation pipe for the main filter element to counteract malfunctions of the fuel filter during operation by compressible gases.

According to one embodiment of the present invention, the ventilation pipe is permanently attached at the filter housing and, in particular, can be snapped together with said filter housing. Thus, in the case of replacing the pre- and the main filter element, the ventilation pipe remains in the sense of a service life component in the filter housing. This offers cost advantages and conserves resources.

According a preferred further development, the ventilation pipe can axially protrude over an upper end plate of the main filter element by its inlet opening or it can be flush or substantially flush with the upper end plate of the main filter element. In doing so, a safe ventilation of the main filter element is ensured.

The ventilation pipe runs at the other end preferably into a fuel return line of the filter housing, via which the fuel is returnable to a fuel tank. The ventilation pipe can, if needed, be provided with a throttle to counteract a retrograde entry of contaminants into the area of the main filter element.

The ventilation pipe can, in the case that the filter insert has a previously described water separation unit, include a tube element by which the water discharge channel of the water separation unit of the fuel filter insert, in the operating position situated within the filter element, is limited on the inside in the radial direction.

According to the present invention, the filter housing can include a water discharge nozzle which sealingly extends in the axial direction into the receiving gap between the wall element and the lower end plate of the pre-filter element. In this way, the previous low pressure area and high pressure area of the fuel filter insert can be sealed from each other.

According to a preferred further development of the present invention, in order to exchange the fuel filter element, the fuel filter includes in the filter housing a fuel discharge channel situated below the filter insert, a respective raw side of the pre-filter element and of the main filter element, when the filter insert is in the operating position in the filter housing, being sealed via-a-vis the fuel discharge channel in that the filter insert sealingly abuts at the filter housing, and the raw side of the main filter element being fluidically connectable to the fuel discharge channel by moving the filter insert axially out of its operating position via the raw side of the pre-filter element. In doing so, unfiltered fuel entering the clean side of the fuel filter is counteracted. Moreover, a particularly simple design of the fuel filter results.

DESCRIPTION OF THE INVENTION

Figure 1:
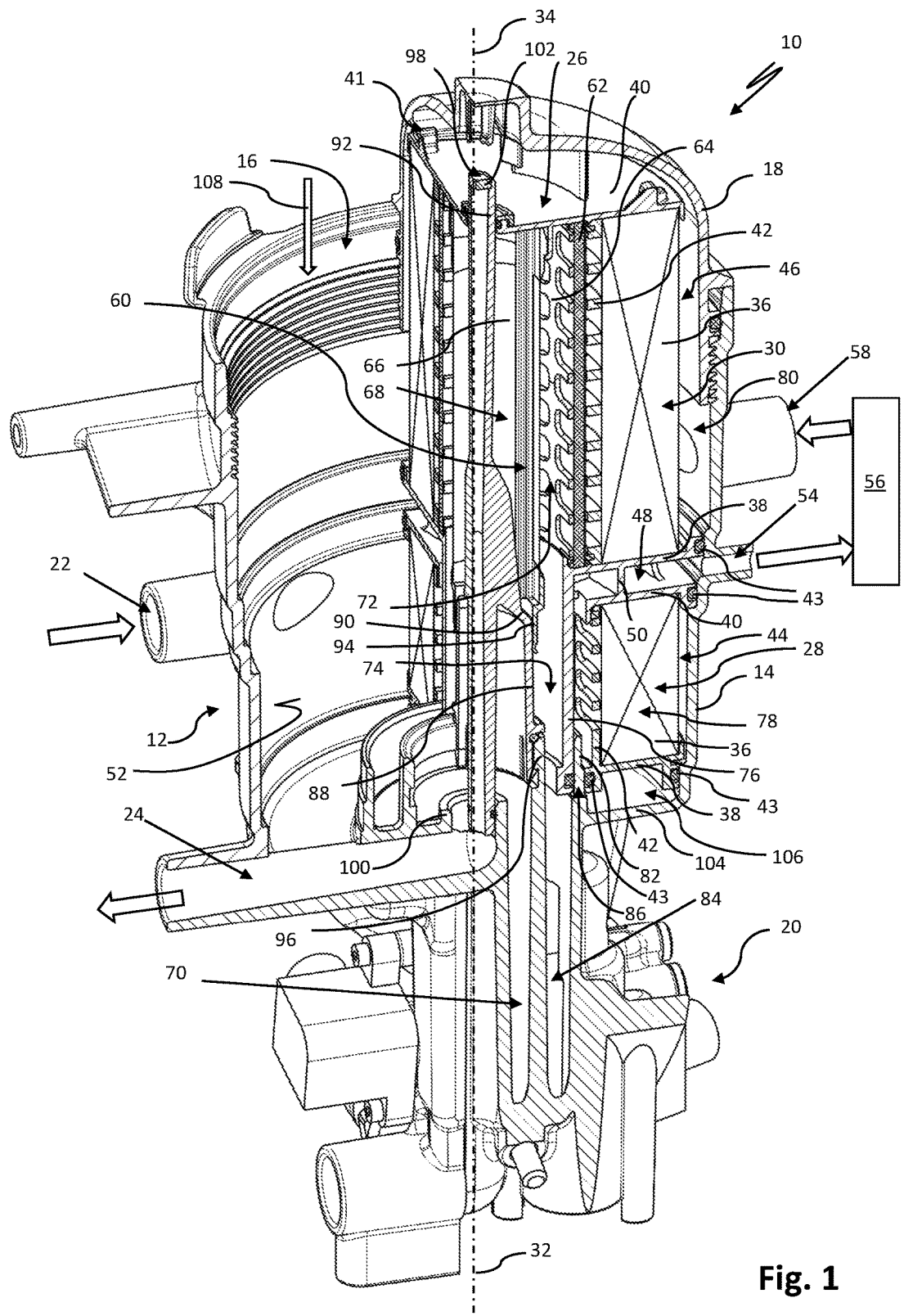
FIG. 1 shows a perspective sectional view of a fuel filter having a filter housing and a filter insert situated therein including a pre- and a main filter element.
Figure 2:
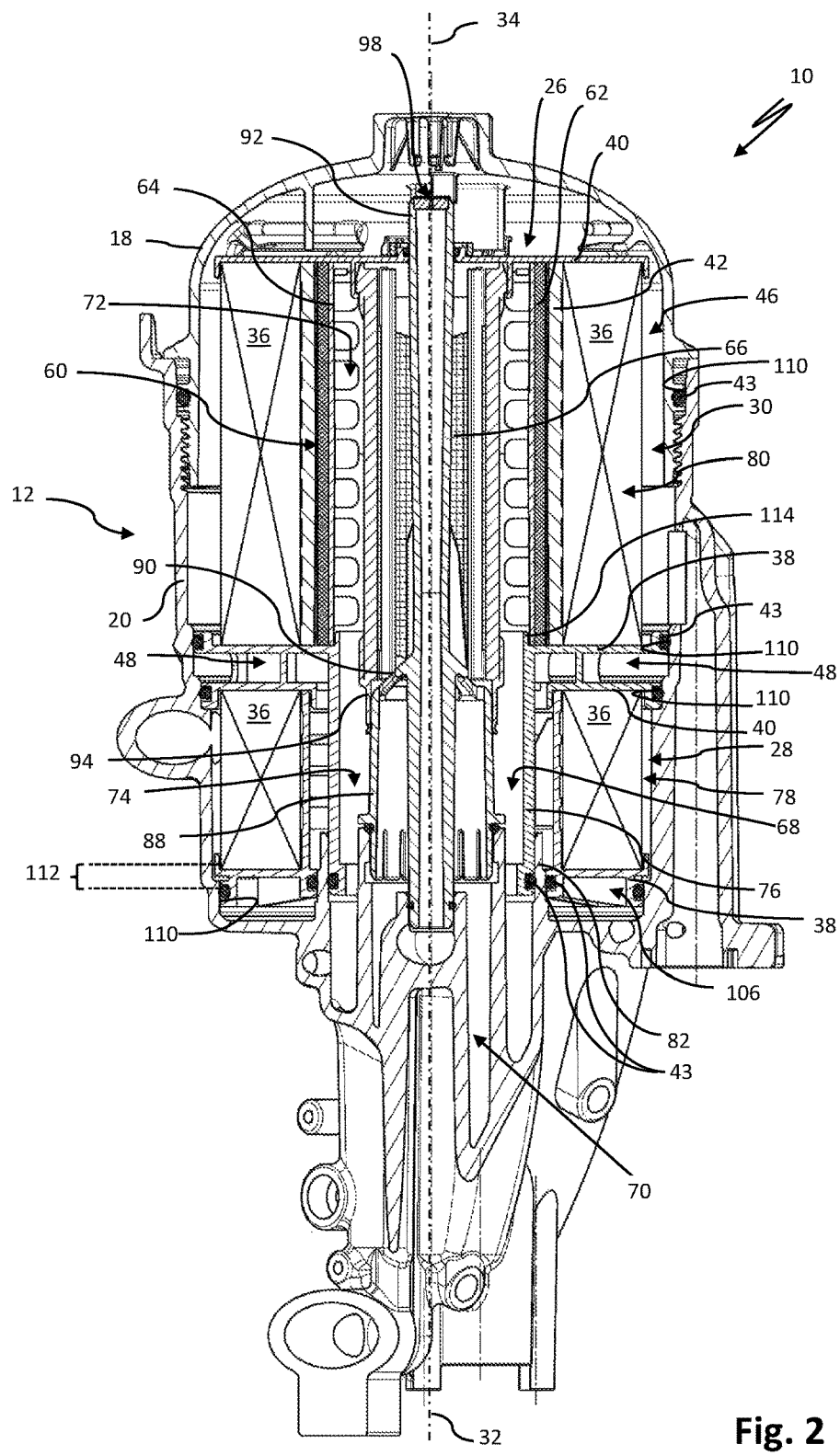
FIG. 2 shows the fuel filter from FIG. 1 in a longitudinal section.

FIGS. 1 and 2 show a fuel filter 10 for out-filtering contaminants included in fuel, in particular in diesel fuel. Fuel filter 10 is suitable, for example, for use in utility vehicles having an internal combustion engine.

Fuel filter 10 includes an openable filter housing 12 having a filter pot 14 which has an insertion opening 16 and a housing cover 18 to close filter pot 14. Filter cover 18 can be screwed into filter pot 14. A different means for fastening filter cover 18 at filter pot 14 is conceivable. Filter housing 12 can, for example, be made out of metal or out of a plastic material. A so-called filter pot 20 is formed at the lower end of filter housing 12. Thus, fuel filter 10 is configured in a manner known per se for a standing arrangement during operation.

Filter housing 12 includes a fuel inlet 22 which is used to supply the fuel to be filtered, for example, from a fuel tank (not shown) to fuel filter 10. A fuel return line 24 of the filter housing is used to return contaminated fuel, for example, to the previously mentioned fuel tank.

A fuel filter insert 26 is situated in the interior of filter housing 12. Fuel filter insert 26 includes a pre-filter element 28 and a main filter element 30. Two filter elements 28, 30 are situated one above the other in filter housing 12 in the direction of longitudinal axis 32 of the fuel filter. Longitudinal axis 32 of the fuel filter coincides with longitudinal axis 34 of fuel filter insert 26. Main filter element 30 is fluidically connected downstream of pre-filter element 28. In other words, the fuel to be filtered first through-flows pre-filter element 28 situated on the bottom of the filter housing and subsequently through-flows main filter element 30 situated above pre-filter element 28.

Pre-filter element 28 and main filter element 30 are each implemented as round filter elements having a filter medium 36 annularly arranged to longitudinal axis 34 of the filter insert. Filter medium 36 of pre-filter element 28 and also of main filter element 30 are each through-flowable by the to-be-filtered fuel in a radial direction with respect to longitudinal axis 34 of fuel filter insert 26 from the outside to the inside. Filter media 36 are each implemented as a filter bellows pleated in a star formation and are held in place situated between a lower and an upper end plate 38, 40. Upper end plate 40 of main filter element 30 is releasably coupleable or coupled with housing cover 18 via a bayonet joint 41 (snap fit connection or the like). In order to brace filter media 36 of pre-filter element 28 and also of main filter element 30 radially from the inside, a lattice-shaped support pipe 42 is respectively used. Filter media 36 abut, preferably directly, at the inside at the respective support pipe.

End plates 38, 40 of the pre-filter element and of the main filter element assigned to each other, that is, lower end plate 38 of the main filter element 30 and upper end plate 40 of the pre-filter element are spaced at a distance from each other in the axial direction. These two end plates 38, 40 respectively sealingly (fluid-tightly) abut via sealing elements 43 at the inside of the filter housing. For this reason, two end plates 38, 40 are used as sealing plates which divide the filter housing on the inside in the axial direction into a pre-filter chamber 44 including pre-filter element 28 and into a main filter chamber 46 including the main filter element. A flow channel 48 for the pre-filtered fuel prefiltered by pre-filter element 28 is situated between upper end plate 40 of pre-filter element 28 and lower end plate 38 of main filter element 30. Flow channel 48 is directly limited in the axial direction by two end plates 38, 40 of the pre-filter element and the main filter element assigned to each other.

Upper end plate 40 of pre-filter element 28 and lower end plate 38 of main filter element 30 are connected to each other for jointly removing main and pre-filter elements 30, 28, in particular, are integrally formed and can be implemented particularly as a plastic injection molding part. As can be concluded from FIGS. 1 and 2, spacer elements 50 are situated between the two end plates, which are attached, in particular molded, to the two end plates.

Flow channel 48 is substantially annularly formed and is in the radial direction fluidically connected to inner wall 52 of filter housing 12. Flow channel 48 is fluidically connected at the side of the outlet to a fuel outlet 54 situated on the (radial) side of filter housing 12. A fuel pump 56 is connectable to fuel outlet 54. Fuel pump 56 is used to suction the contaminated fuel into pre-filter chamber 44 and through pre-filter element 28 and to pump the pre-filtered fuel led out of filter housing 12 again into main filter chamber 46 of filter housing 12 via a fuel inlet, designated with reference numeral 58, of filter housing 12. This is to achieve that the pre-filtered fuel is guided through filter medium 36 of main filter element 30. Fuel inlet 58 is situated axially offset relative to fuel outlet 54 of filter housing 12.

In order to separate the water included in the fuel, main filter element 30 includes a water separation unit 60. Water separation unit 60 includes a coalescing medium 62 which is situated annularly about longitudinal axis 34 of fuel filter insert 26. As it is shown in FIGS. 1 and 2, coalescing medium 62 can, in particular, be fluidically connected downstream of filter medium 36 of main filter element 30. In this instance, coalescing medium 36 advantageously abuts at the inside at a center pipe 64 so that the same does not collapse when subjected to pressure while fuel filter 10 is operated. Center pipe 64 is situated within support pipe 42 and coaxially to longitudinal axis 34 of fuel filter insert 26. Thus, coalescing medium 62 is situated between center pipe 64 and support pipe 42 of filter medium 36 of main filter element 30. If applicable, coalescing medium 64 can be formed by one or a plurality of layers and, for example, be made of a nonwoven fabric.

As can be concluded from FIGS. 1 and 2, a screen pipe 66 is situated within the center pipe. Screen pipe 66 functions as an end separator for the water included in the fuel. Screen pipe 66 is situated running coaxially to longitudinal axis 34 of fuel filter insert 26. The interior of screen pipe 66 is fluidically connected via a fuel discharge channel 68, which partially extends in the axial direction through pre-filter element 28, to a fuel channel 70 of filter housing 12. The fuel filtered by pre- and main filter elements 28, 30 and at least partially freed from water drains during operation from the interior of screen pipe 66 via fuel discharge channel 68 and fuel channel 70 of filter housing 12 downwards from fuel filter insert 26.

An annular water separation gap 72 is formed between screen pipe 66 and coalescing medium 62 or center pipe 64. Water separation gap 72 is designed to be open in the downward direction and, at one end, is fluidically connected with a longitudinally extending water discharge channel 74.

A substantially tubular wall element 76 is attached, in particular molded, at lower end plate 38 of main filter element 30, which extends in the axial direction from lower end plate 38 of main filter element 30 in the direction of the filter head, that is, extends downwards. Wall element 76 extends in the axial direction up to the level of lower end plate 38 of pre-filter element 28 into the pre-filter element. Wall element 76 internally limits pre-filter chamber 44 in the radial direction and separates said pre-filter chamber vis-a-vis water discharge channel 74 of fuel filter insert 26. In other words, water discharge channel 74 for the water separated from the fuel is on the outside directly limited in the radial direction by tubular wall element 76.

Thus, wall element 76 overall separates a low pressure area 78 including pre-filter element 28 and a high pressure area 80 including main filter element 30 of fuel filter insert 26 from each other.

Water discharge channel 68 can extend in the axial direction completely or partially through pre-filter element 28 and is fluidically connected via a housing or water discharge nozzle 82 of filter housing 12 to a water discharge channel or water collecting channel 84.

Tubular wall element 76 and lower end plate 38 of pre-filter element 28 jointly limit a receiving gap 86 into which housing or water discharge nozzle 82 sealingly protrudes in the axial direction. Wall element 76 sealingly abuts via a sealing element 43 on the inside at water discharge nozzle 82 and lower end plate 38 of pre-filter element 28 sealingly abuts via a further sealing element 43 on the outside at water discharge nozzle 82. In doing so, the low-pressure area or pre-filter chamber 44 is sealed against the high pressure area or water discharge channel 74.

Water discharge channel 74 is on the inside limited in the radial direction by a pipe element 88. At the same time, pipe element 88 forms a radial outside boundary of fuel discharge channel 68. At one end, pipe element 88 is molded via a (not shown) fenestrated connecting section 90 situated running obliquely to the longitudinal axis 34 of the fuel filter insert to a centrally situated ventilation pipe 92 of fuel filter 10. Alternatively, the pipe element can also be configured as part of screen pipe 66 of fuel filter insert 26.

A free end section of screen pipe 66 is configured as a sealing lip or a sealing collar 94 and sealingly abuts at the total outer circumference at pipe element 88. Pipe element 88 of ventilation pipe 92 is at the other end, that is, at its lower end, snapped (or screwed) together with a fuel discharge nozzle 96 of filter housing 12 and on the inside sealingly abuts thereto via a sealing element 43.

Ventilation pipe 92 is used to ventilate main filter element 30 or main filter chamber 46 and extends coaxially to longitudinal axis 34 of the fuel filter insert through said fuel filter insert. Ventilation pipe 92 can axially project at one end by its inlet opening 98 over upper end plate 40 of main filter element 30. In this case, inlet opening 98 of ventilation pipe 92 is situated between upper end plate 40 of main filter element 30 and housing cover 18. It is evident that ventilation pipe 92 can be situated being flush or being substantially flush with upper end plate 40 of the main filter element. At the other end, ventilation pipe 92 sealingly projects into a venting nozzle 100 of filter housing 12. Venting nozzle 100 can be fluidically connected to fuel return line 24 of filter housing 12. In this way, when operating fuel filter 10, air or outgassings of the fuel included in the fuel can be evacuated in the area of main filter chamber 46 from filter housing 12 via ventilation pipe 92 and fuel return line 24 of filter housing 12. For security purposes, ventilation pipe 92 can, for example, in the area of its inlet opening 98, be provided with a throttle 102.

Pre-filter chamber 44 is limited downwards by a housing bottom 104 of filter housing 12. Pre-filter element 28 is, in its shown installation state, situated axially spaced from housing bottom 104. For this purpose, a fuel discharge channel 106 is formed or defined between lower end plate 38 of pre-filter element 28 and housing bottom 104. Fuel discharge channel 106 engages around longitudinal axis 32 of fuel filter housing 12 and is open towards fuel return line 24 of filter housing 12, meaning, is fluidically connected to said fuel return line.

Filter pot 14 has an interior cross section which is tapered axially in the direction of housing bottom 102, that is, in inserting direction 108 of the fuel filter insert. For this reason, filter housing 12 includes, in the area of its interior wall 52, sealing area sections 110 for end plates 38, 40 of the fuel filter insert to sealingly abut, which are, at an increasing distance from insertion opening 16 of filter housing 12 in the direction of housing bottom 104, spaced less far apart from longitudinal axis 34 of fuel filter element 26. Sealing elements 43 of lower end plate 38 of main filter element 30 and of two end plates 38, 40 of pre-filter element 29 are, in a thereto corresponding manner, spaced at different widths to longitudinal axis 34 of fuel filter insert 26 and, in the shown operating position of fuel filter insert 26 in filter housing 12, sealingly abut at sealing area sections 110 of filter pot 20. In doing so, fuel filter insert 26 can be inserted into its operating position in the filter housing in a simplified manner and without unnecessarily overloading its sealing elements 43.

For exchanging fuel filter insert 26, said fuel filter insert is moved axially out of filter pot 14 opposite to inserting direction 108. As soon as the fuel filter insert has been moved over an axial distance denoted by reference numeral 112 (FIG. 2) from its shown installation position into a drainage position, sealing elements 43 of lower and upper end plates 38, 40 of pre-filter element 28 and of lower end plate 38 of main filter element 30 are removed from their respective sealing position at filter housing 12 or from water discharge nozzle 82. Consequently, main filter chamber 46 is fluidically connected to fuel discharge channel 106 via pre-filter chamber 44. In doing so, the raw-sided fuel can—following gravity—flow from main filter chamber 46 via pre-filter chamber 44 together with the raw-sided fuel situated therein into fuel discharge channel 106. The fuel can drain via fuel discharge channel 106 into fuel return line 24.

It is to be noted that the axial length of housing-sided water discharge nozzle 82 is sized in such a manner that sealing element 43 of wall element 76 in the draining position of fuel filter insert 26 continues to sealingly abut at water drainage nozzle 82. In doing so, it is ensured that fuel from pre-filter chamber 44 does not reach the clean side of fuel filter 10, here, the water discharge (nozzle) or fuel discharge nozzle 96 of fuel channel 70.

Figure 3:
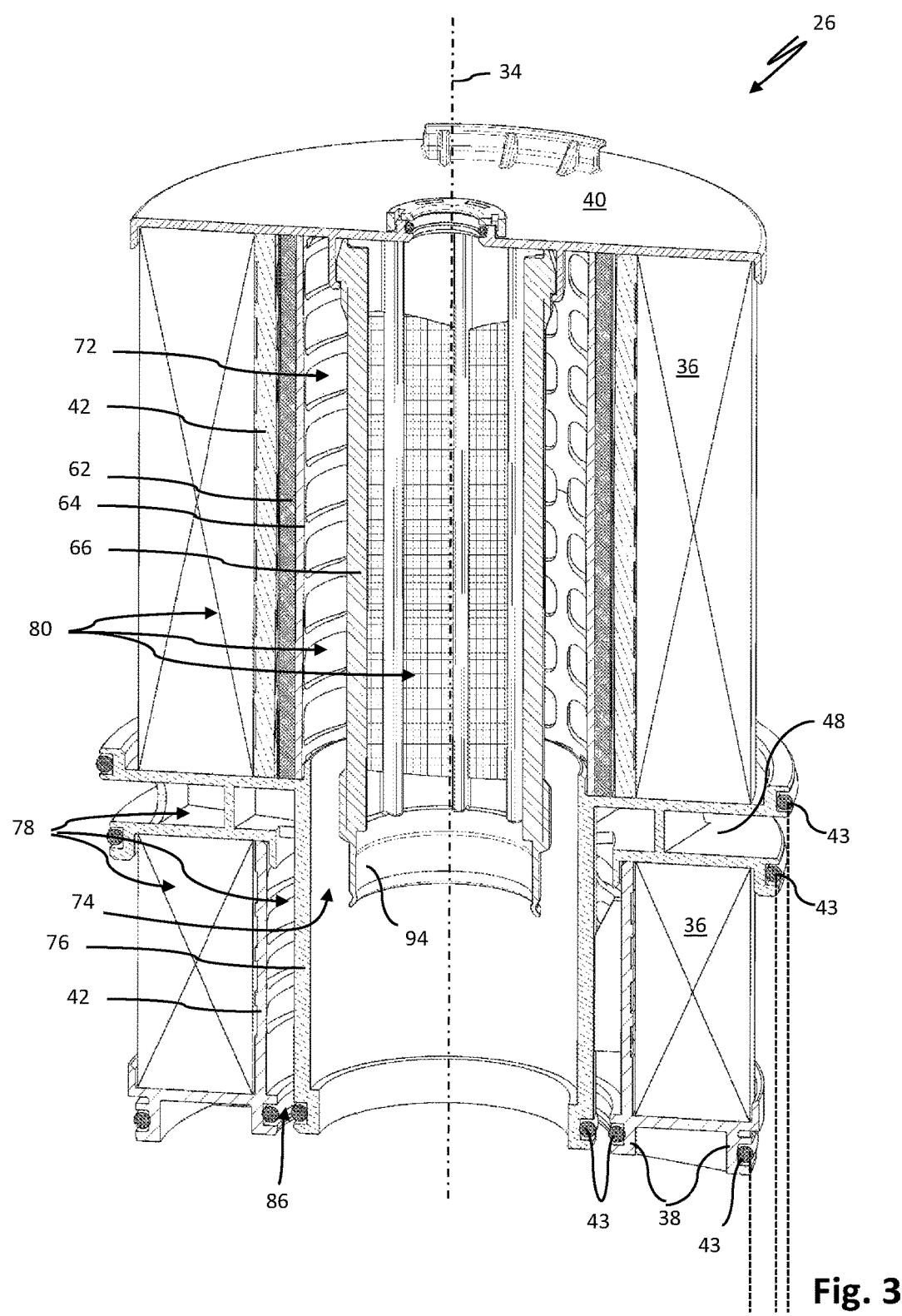
FIG. 3 shows the fuel filter from FIG. 1 in an open sectional view.

FIG. 3 shows the fuel filter insert from FIGS. 1 and 2 in an open illustration and in a longitudinal section. The lattice structure of screen pipe 66 can be seen well in this illustration. Screen pipe 66 is connected to upper end plate 40 of main filter element 30, for example, is snapped together. Sealing collar 94 of the screen pipe can be made out of an elastically deformable (plastic) material. In doing so, sealing collar 94 can, when axially inserting fuel filter insert 26 into the filter housing (FIGS. 1 and 2) and guided along obliquely running connecting section 90 of ventilation pipe 92, be sealingly pushed onto pipe element 88. Lower end plate 38 of main filter element 30 includes a holding rib 114 at the inner circumferential side. Holding rib 114 protrudes axially from lower end plate 38 in the direction of upper end plate 40 of main filter element 30 and braces center pipe 64 on the inside.

When operating fuel filter 10, the unfiltered fuel suctioned by the fuel pump flows via fuel supply 22 of the filter housing into pre-filter chamber 44 and through-flows filter medium 36 of pre-filter element 28 in the radial direction from the outside to the inside. Through tubular wall element 76 of the main filter element, the fuel reaches, via flow channel 48 and the lateral fuel outlet 54 of the filter housing, fuel pump 56. By means of the fuel pump fluidically interposed between fuel outlet 54 and fuel inlet 58, the pre-filtered fuel is pumped into main filter chamber 46 of filter housing 12. The pre-filtered fuel through-flows filter medium 36 of main filter element 30, coalescing medium 62 and the screen pipe in a radial direction to longitudinal axis 34 of fuel filter insert 26 from the outside to the inside. In doing so, the water included in the fuel is at least partially separated and flows, following gravity, from water separation gap 72 via water discharge channel 68 downwards into water collecting space 84 of filter housing 12. The fuel in this manner freed of contaminants flows via fuel channel 70 out of fuel filter 10 and can be supplied to an internal combustion engine or a fuel injection pump.

For replacing fuel filter insert 26, in a first step, housing cover 18 is removed from filter pot 20. Bayonet connection 41 between housing cover 18 and fuel filter insert 26 is closed or is closed by the screwing movement of housing cover 18. Fuel filter insert 26 is moved axially in the direction of longitudinal axis 32 of filter housing 12 as one piece out of its installation position (FIGS. 1 and 2) by the screwing movement. As soon as the filter insert is located in the drainage position, the raw-sided (pre-filtered) fuel flows from main filter chamber 46 of filter housing 12 into pre-filter chamber 44 and, together with raw-sided fuel therein situated, via fuel discharge channel 106 into fuel return line 24 and, if applicable, into a thereto fluidically connected fuel tank. When further unscrewing or lifting off housing cover 18 from filter pot 14 together with fuel filter insert 26, inner-sided sealing element 43 of wall element 76 and sealing element 43 of lower end plate 43 of pre-filter element 28 abutting at water discharge nozzle 82 are also moved out of their sealing abutment at water discharge nozzle 82. A clean-sided, possibly present fluid level of a fuel-water mixture then can flow radially outwards into fuel discharge channel 106 and drain via fuel return line 24 from filter housing 12. After completely removing fuel filter insert 26 from the filter pot, the same is uncoupled from housing cover 18 and a new fuel filter insert 26 is attached at housing cover 18. Fuel filter insert 26 is subsequently inserted into filter pot 14 in the inserting direction and is moved into its installation position by tightly screwing housing cover 18 at filter pot 14 (FIGS. 1 and 2).

What is claimed is:

1. A fuel filter insert for a fuel filter comprising:
a pre-filter element having upper and lower end plates, the end plates arranged on opposing ends of filter medium of the pre-filter element; and
a main filter element having upper and lower end plates, the end plates arranged on opposing ends of filter medium of the main filter element;
wherein the pre-filter element and the main filter element are arranged one above the other in a direction of a longitudinal axis of the fuel filter insert;
wherein at least one of the filter elements is through-flowable from the outside to the inside by fuel in a radial direction relative to the longitudinal axis; and
a flow channel for the fuel pre-filtered by the pre-filter element;
wherein the flow channel is arranged to extend in the axial direction between the pre-filter element and the main filter element;
wherein the flow channel in the axial direction is directly limited by the end plates of the pre-filter element and an end plate of the main filter element;
wherein the main filter element comprises
a water separation unit operable to separate water from fuel;
wherein the water separation unit comprises
a water separation gap which is, at one end, fluidically connected or connectable to a water discharge channel;
wherein the water discharge channel extends in the axial direction at least in sections through the pre-filter element.

2. The fuel filter insert according to claim 1, wherein
an end plate of the pre-filter element and of the main filter element limiting the flow channel are connected to each other and are integrally formed, for jointly removing the main and pre-filter element as a unitary component.

3. The fuel filter insert according to claim 1, wherein
at least one spacer element is arranged and situated between and connecting one of the end plates of the pre-filter element to one of the end plates of the main filter element;
wherein the at least one spacer element each are molded with and formed in one piece with the connected end plates of the pre-filter and the main filter elements.

4. The fuel filter insert according to claim 1, wherein
the water discharge channel is limited on the radially outer side, relative to the longitudinal axis, by a wall element which is attached to and molded in one piece with one of the two end plates of the main filter element, limiting the flow channel.

5. The fuel filter insert according to claim 4, wherein
the wall element forms together with a lower end plate of the pre-filter element a receiving gap for receiving a water discharge nozzle of a filter housing.

6. The fuel filter insert according to claim 1, wherein
the water separation unit comprises
a coalescing medium which is fluidically connected downstream of the filter medium of the main filter element.

7. The fuel filter insert according to claim 1, wherein
the filter medium of the pre-filter element and/or the main filter element is braced and on a radial inside on a support pipe.

8. A fuel filter comprising
a filter housing; and
a fuel filter insert arranged in an interior of the filter housing, the fuel filter insert including:
a pre-filter element having an upper and a lower end plate, the end plates arranged on opposing ends of filter medium of the pre-filter element; and
a main filter element having an upper and a lower end plate, the end plates arranged on opposing ends of filter medium of the main filter element;
wherein the pre-filter element and the main filter elements are arranged one above the other in a direction of a longitudinal axis of the fuel filter insert;
wherein at least one of the filter elements is through-flowable from the outside to the inside by fuel in a radial direction relative to the longitudinal axis; and
a flow channel for the fuel pre-filtered by the pre-filter element;
wherein the flow channel is arranged to extend in the axial direction between the pre-filter element and the main filter element; and
wherein the flow channel in the axial direction is directly limited by and the end plates of the pre-filter element and an end plate of the main filter element;
wherein the fuel filter insert having the two end plates of the pre-filter element limiting the flow channel sealingly abuts against an inner side of the the filter housing;
wherein a lateral fuel outlet is formed at the filter housing, via which the flow channel is fluidically connectable to a fuel pump to pump the fuel pre-filtered by the pre-filter element via a fuel inlet formed on the side of the filter housing, to the main filter element.

9. The fuel filter according to claim 8, wherein
the filter housing comprises a ventilation pipe which at least partially extends through an interior of the fuel filter insert.

10. The fuel filter according to claim 9, wherein
the ventilation pipe radially limits a water discharge channel of a water separation unit of the fuel filter insert on the inside.

11. The fuel filter according to claim 10, wherein
the ventilation pipe at one end is connected to a fuel return line of the filter housing to return the fuel to a fuel tank.

12. The fuel filter according to claim 8, wherein
the main filter element includes a water separation unit operable to separate water from fuel;
wherein the water separation unit includes
a water separation gap which is, at one end, fluidically connected or connectable to a water discharge channel;
wherein the water discharge channel extends in the axial direction at least in sections through the pre-filter element;

wherein the water discharge channel is limited on the radially outer side, relative to the longitudinal axis, by a wall element which is attached to and molded in one piece with one of the two end plates of the main filter element, limiting the flow channel;

wherein the wall element forms together with a lower end plate of the pre-filter element a receiving gap for receiving a water discharge nozzle of a filter housing;

wherein the filter housing has a water discharge nozzle sealingly extending into the receiving gap between the wall element and the lower end plate of the pre-filter element.

13. The fuel filter according to one claim 8 wherein the filter housing includes a fuel discharge channel arranged below the fuel filter insert;

wherein, when the fuel filter insert is in the operating position in the filter housing, a respective raw side of the pre-filter element and of the main filter element is sealed vis-a-vis the fuel discharge channel by the fuel filter insert sealing abutting against at the filter housing; and wherein the raw side of the main filter element is fluidically connectable to the fuel discharge channel via the raw side of the pre-filter element by moving the fuel filter insert in the axial direction out of its operating position.

\* \* \* \* \*